(12) United States Patent
Skiba et al.

(10) Patent No.: US 7,226,088 B2
(45) Date of Patent: Jun. 5, 2007

(54) BANJO FITTING

(75) Inventors: Terence E. Skiba, Ocala, FL (US); Robert Williamson, Bloomfield Hills, MI (US); Dave P. Zolnai, Liberty, SC (US); Martin L. Schefcik, Pickens, SC (US); Ronald W. Keene, Rochester Hills, MI (US); Edward Zeimet, Liberty, SC (US)

(73) Assignee: Dayco Products, LLC, Miamisburg, OH (US)

( * ) Notice: Subject to any disclaimer, the term of this patent is extended or adjusted under 35 U.S.C. 154(b) by 520 days.

(21) Appl. No.: 10/848,790

(22) Filed: May 18, 2004

(65) Prior Publication Data

US 2006/0033328 A1 Feb. 16, 2006

(51) Int. Cl.
*F16L 35/00* (2006.01)
(52) U.S. Cl. .................. 285/92; 285/282; 285/114
(58) Field of Classification Search ................ 285/190, 285/282, 114, 92
See application file for complete search history.

(56) References Cited

U.S. PATENT DOCUMENTS

| 716,204 | A | * | 12/1902 | Waldo ........................ 70/232 |
| 1,599,775 | A | * | 9/1926 | Lamb et al. ................. 285/114 |
| 2,423,069 | A | * | 6/1947 | McElhose et al. .......... 285/181 |
| 3,685,842 | A | | 8/1972 | Cyphelly |
| 3,874,713 | A | * | 4/1975 | Myers ........................ 285/340 |
| 4,185,494 | A | | 1/1980 | Yelke |
| 4,679,829 | A | * | 7/1987 | Yanagisawa ................. 285/190 |
| 4,711,092 | A | | 12/1987 | Prusak |
| 4,790,055 | A | | 12/1988 | Raufeisen et al. |
| 4,894,900 | A | | 1/1990 | Rausfeisen et al. |
| 4,938,193 | A | | 7/1990 | Raufeisen et al. |
| 5,011,192 | A | * | 4/1991 | Campo ........................ 285/23 |
| 5,163,226 | A | | 11/1992 | Phelps |
| 5,222,768 | A | * | 6/1993 | Hofer et al. .................. 285/39 |
| 5,228,725 | A | * | 7/1993 | Aoyagi et al. ........... 285/141.1 |
| 5,297,855 | A | | 3/1994 | Jeng |
| 5,362,111 | A | * | 11/1994 | Harbin ........................ 285/92 |
| 5,403,041 | A | * | 4/1995 | Merkel et al. ................. 285/4 |
| 5,490,693 | A | * | 2/1996 | Fisher et al. ................. 285/92 |
| 5,533,764 | A | * | 7/1996 | Williamson ................. 285/212 |
| 5,992,515 | A | | 11/1999 | Spiegel |
| 6,135,509 | A | * | 10/2000 | Billington, III .............. 285/92 |
| 6,139,068 | A | * | 10/2000 | Burress et al. ............... 285/92 |
| 6,312,020 | B1 | * | 11/2001 | Ketcham et al. ......... 285/142.1 |
| 6,494,498 | B2 | * | 12/2002 | Brandt et al. ............... 285/319 |
| 6,688,440 | B2 | * | 2/2004 | Matsushita et al. ......... 188/344 |
| 2003/0042737 | A1 | * | 3/2003 | Sampson .................... 285/190 |

* cited by examiner

*Primary Examiner*—Eric K. Nicholson
(74) *Attorney, Agent, or Firm*—Joseph V. Tassone; Thompson Hine LLP

(57) ABSTRACT

A banjo fitting is disclosed comprising a block, a stud, a saddle washer pair and a cap. The saddle washer pair is bent so as to partially surround and clip onto the block. In this manner the block and washer pair form a single unit to simplify installation of the banjo fitting. The block further includes a pair of walls that extend from opposite faces of the block and engage the stud so as to provide a clocking feature. In this manner, the stud and the block remain properly aligned even as the cap is tightened on the stud to secure the block.

17 Claims, 2 Drawing Sheets

BANJO FITTING

BACKGROUND

Banjo fittings are widely used to make fluid connections when fluid must be supplied to a component through a 90 degree change of direction or other similar reorientation of fluid flow. Banjo fittings are so named because of their shape, which usually includes a tube brazed onto a round component, giving rise to a substantially banjo-shaped assembly. Unlike other components that perform the same function, banjo fittings can be readily assembled with power tools and offer inherent assembly benefits in applications where time to assemble and ease of access to components are important considerations.

FIGS. 1A and 1B show a prior art banjo fitting 100 comprised of a block 118 with an opening 120 through which a bolt 102 is inserted. The combination of block 118 and bolt 102 is assembled to make a fluid connection by tightening the bolt 102 to a fluid port 104 of a component. When assembled, a passageway 112 through the block 118 is placed in fluid communication with the port 104 through a passageway 114 in the bolt 102. To minimize leakage, copper washers 116 are generally placed on opposite sides of the block 118 to provide a high pressure seal on both sides of the block 118 when the bolt 102 is tightened.

One drawback of the prior art banjo fitting 100 is the extent of assembly that is required. Specifically, because separate washers 116 are used, the bolt 102 must first be inserted through one washer, then the block 118, and then a second washer prior to tightening the bolt 102 to the port 104. Pre-assembly of the washers 116, block 118 and bolt 102 is not feasible in the prior art banjo fitting 100. Accordingly, the washers 116 may become separated or lost during assembly.

Another drawback of the prior art banjo fitting design 100 is the need to widen or hollow out a central chamber 110 of the block 118. Because the bolt 102 of the prior art banjo fitting 100 is turned during tightening, the bolt passageway 114 may not be directly aligned with the block passageway 112 at the conclusion of assembly. To overcome this problem of misalignment, the central chamber 110 of the block 118 is hollowed out or widened so that the bolt passageway 114, regardless of angular orientation, is always in fluid communication with the block passageway 112 through the central chamber 110. The process of widening or hollowing out the central chamber 110 of the block 118 is expensive and time consuming.

Accordingly, a new banjo fitting is desired that addresses the problems associated with the prior art design.

SUMMARY OF INVENTION

According to a first aspect, a new banjo fitting is provided having a saddle washer pair that clamps around the banjo block to keep the washer pair in place. As a result, the block/washer combination forms a single sub-assembly such that an installer can place the block/washer combination into position with one hand and tighten it down with the other hand. This design significantly simplifies assembly and furthermore keeps the washers from sliding off during shipment. In one embodiment, at lease one washer of the washer pair includes a tab that is folded over to retain the washer pair in place when clipped onto the banjo block. The tab may engage a flat surface on the block to prevent the washer pair from rotating on the block.

According to a second aspect, a new banjo fitting is provided having a clocking feature. Clocking refers to positioning a component, the banjo block in this case, in a specific orientation while the component is tightened into place. The new banjo fitting's clocking feature is accomplished by extending at least one wall of the banjo block, such that the extended wall prevents the block from turning as the banjo fitting is tightened into place. As a result of this clocking feature, the fluid passageways in the banjo fitting will remain aligned throughout tightening down of the fitting thereby reducing manufacturing costs by eliminating the need to widen or hollow out the central chamber of the block.

DETAILED DESCRIPTION OF THE INVENTION

Figure 1A:
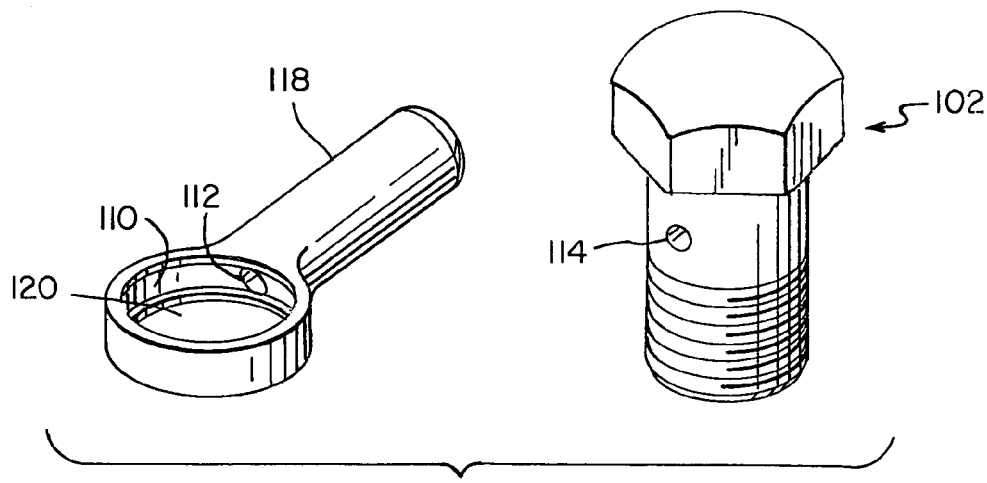
FIG. 1A is a perspective view of a prior art banjo block and bolt.

In one embodiment, a banjo fitting is provided comprising a banjo block 10, a saddle washer pair 12, a stud 38 and a cap 60. The block 10 and saddle washer pair 12 together comprise a block/washer subassembly 6, as depicted in FIG. 4B. The cap 60 mates with and is received on the stud 38 to secure the block/washer sub-assembly 6 to the stud 38.

Figure 2A:
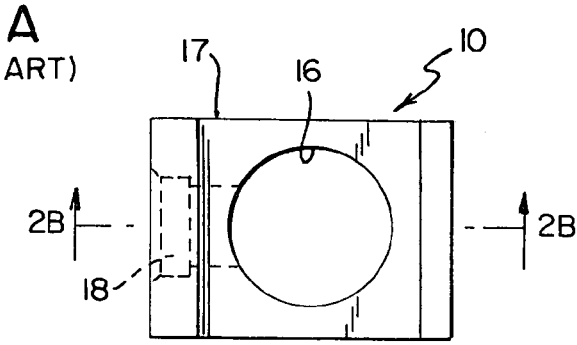
FIG. 2A is a top view of a banjo block according to one embodiment.
Figure 2B:
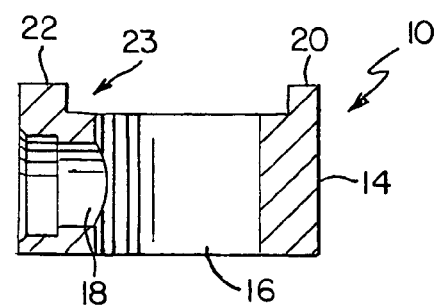
FIG. 2B is a cross-sectional view of the banjo block of FIG. 2A.

Referring to FIGS. 2A and 2B, the block 10 includes a central opening 16 through the block 10, a fluid passageway 18 in communication with the central opening 16, at least one flat outer surface 17 and walls 20 and 22 that extend from the sides 14 of the block 10 to form a channel 23. In another embodiment a single wall may be used. The fluid passageway 18 may be connected to a fluid source (not shown) for providing fluid to a component through the banjo fitting.

Figure 4A:
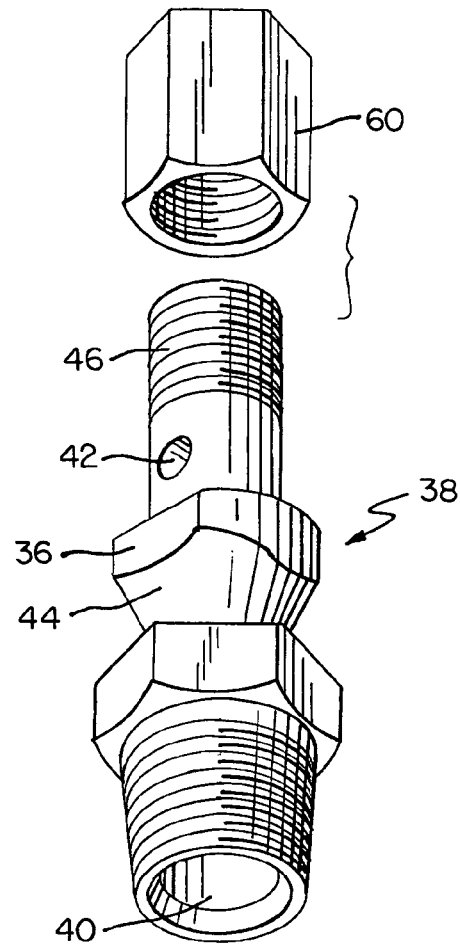
FIG. 4A is a perspective view of a banjo fitting stud and cap according to one embodiment.
Figure 4C:
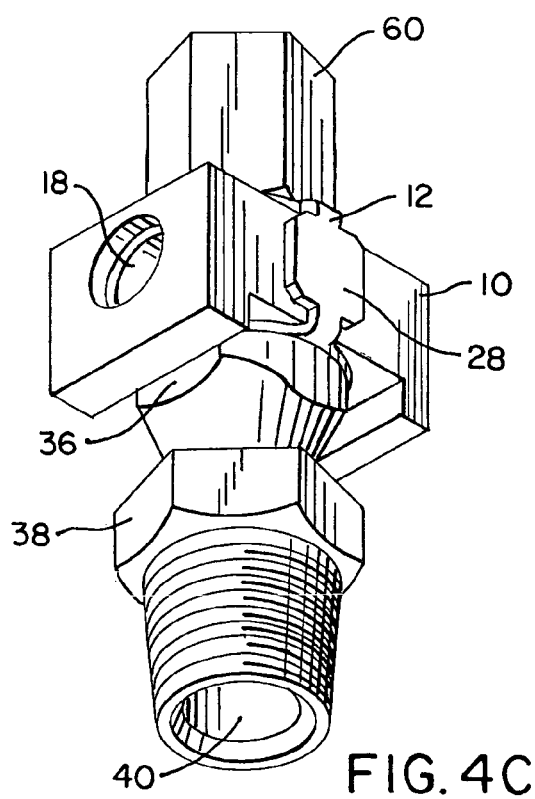
FIG. 4C is a perspective view of an assembled banjo fitting according to one aspect.
Figure 4B:
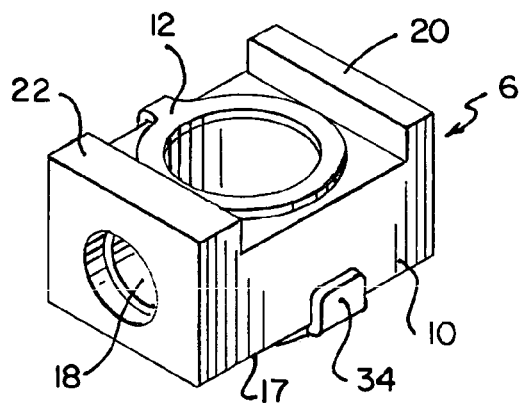
FIG. 4B is a perspective view of the saddle washer of FIG. 3A clipped to the banjo block of FIG. 2A.

Referring to FIG. 4A, the stud 38 comprises a post portion 46 and a base portion 44 that may be integrally formed together or otherwise rigidly attached. The distal ends of the post portion 46 and the base portion 44 may include outer threads for coupling the stud 38 to other components as described below. The cap 60 may include mating threads for threaded engagement on the end of the post portion 46. The stud 38 further includes a fluid passageway 40 that extends axially through the base portion 44 and intersects one or more radial fluid ports 42 located in the post portion 46. In operation, the base portion 44 of the stud 38 may be mounted to a hydraulic component (not shown), as in the prior art, such that the fluid passageway 40 is in fluid communication with the component.

The base portion 44 of the stud 38 also includes at least one flat 36 to ensure proper alignment between the block 10 and the stud 38 and to provide the aforementioned clocking feature. Specifically, the block 10 and the base portion 44 may be dimensioned such that the block 10 cannot be seated over the base portion 44 unless the flat 36 on the base portion 44 is turned to face one of the walls 20 or 22 that extend from the block 10. In a preferred embodiment, the base portion 44 includes two diametrically opposed flats that face walls 20 and 22, respectively, when the block 10 is seated over the base portion 44. In this embodiment, the base portion 44 of the stud 38 will only fit within the channel 23 on the block 10 at particular angular orientations.

Figure 3A:
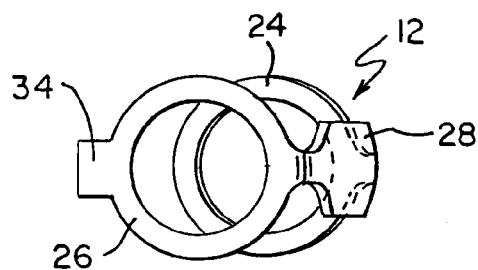
FIG. 3A is a perspective view of a saddle washer pair according to one embodiment.
Figure 3B:
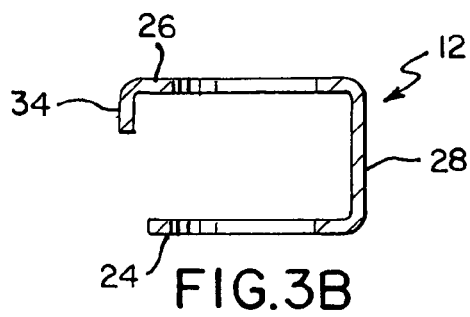
FIG. 3B is a cross-sectional view of the saddle washer pair of FIG. 3A.

Referring to FIGS. 3A and 3B, the saddle washer pair 12 includes a lower washer 24 and an upper washer 26 connected by a link 28. Either the lower washer 24 or the upper washer 26 may include a tab 34 that extends from the washer diametrically opposite the link 28. When the washer pair 12 is formed as shown in FIG. 3B to partially surround the block 10 as shown in FIG. 4B, both washers 24, 26 can be maintained in the proper position on the block 10 during shipping and installation. In particular, the tab 34 may engage the flat outer surface 17 of the block 10 to prevent the washer pair 12 from rotating on the block 10. Although the saddle washer pair 12 of the preferred embodiment comprises just one tab, one skilled in the art can appreciate the fact that a saddle washer pair comprising two tabs may also be used. The washer pair 12 may be made of aluminum, copper, brass, or any other suitable washer material. Improved corrosion resistance, however, has been found with the use of aluminum washers.

To assemble the banjo fitting, the block/washer sub-assembly 6 is placed on the stud 38 such that the post portion 46 of the stud 38 passes through the central opening 16 of the block 10 and the saddle washer pair 12. The base portion 44 of the stud 38 may already be rigidly mounted to a component such as a hydraulic actuator. Before the block/washer sub-assembly 6 can be completely seated on the stud 38, however, the walls 20 and 22 of the block 10 must be aligned with the flat 36 on the base portion 44 of the stud 38. In this manner, proper alignment permits passage of fluid to and from the bolt passageway 40 through the block passageway 18. Once the block 10 is completely seated on the stud 38, the cap 60 is tightened down on the protruding post portion 46 of the stud 38 to secure the block/washer subassembly 6 and provide a fluid seal.

Interference between the walls 20 and 22 of the block 10 and the base portion 44 of the stud 38 will prevent relative rotation such that the block/washer sub-assembly 6 will be maintained in the correct angular orientation even as the cap 60 is tightened onto the post portion 46 of the stud 38. In other words, the block 10 is clocked during this tightening operation and there is no need for a fastening apparatus to keep the block 10 from turning as the cap 60 is tightened.

Figure 1B:
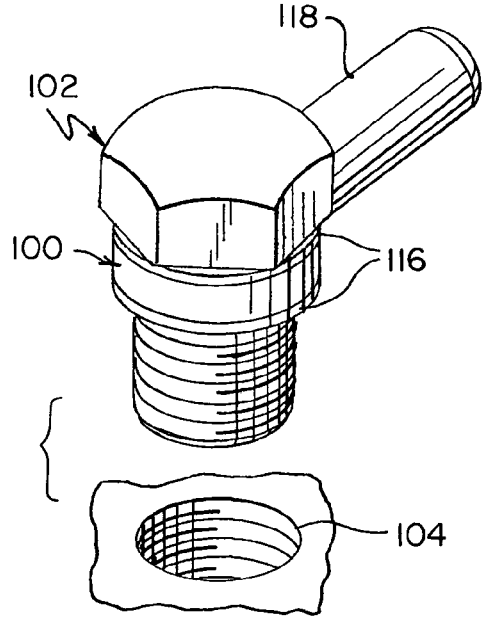
FIG. 1B is a perspective view of an assembled prior art banjo fitting.

In another embodiment, the central opening 16 in the banjo may be widened to facilitate the passage of fluid around the post portion 46 in the block 10. Usually the central opening 16 is widened by casting or milling the central opening 16 with a concave annular space or cavity similar to the central chamber 110 of the prior art banjo fitting shown in FIG. 1.

What is claimed is:

1. A banjo fitting comprising:
a block having an opening through the block, a fluid passageway that intersects with and is in fluid communication with the opening and at least one wall that extends from a face of the block; and
a stud that is received in the opening through the block, the stud having a base portion, an axial fluid passageway through the base portion, and a radial fluid port in fluid communication with the axial fluid passageway;
wherein when the stud is received in the opening through the block, the radial fluid port in the stud is in fluid communication with the fluid passageway in the block and the stud is prevented from rotating within the opening through the block by interfering engagement between the base portion of the stud and the wall that extends from the block.

2. The banjo fitting of claim 1, wherein the base portion of the stud includes a flat that is adjacent the wall that extends from the block when the stud is received in the opening through the block and wherein interfering engagement between the flat and the wall prevents rotation of the stud within the opening through the block.

3. The banjo fitting of claim 2, wherein the radial fluid port in the stud is aligned with the fluid passageway in the block when the stud is received in the opening through the block and when the flat on the base portion of the stud is adjacent the wall that extends from the block.

4. The banjo fitting of claim 1, further comprising a washer pair having an upper washer and a lower washer connected by a link and having at least one tab extending from one of the upper washer and the lower washer, wherein the washer pair is formed such that the washer pair partially surrounds and is maintained on the block with the upper and lower washers aligned with the opening through the block.

5. The banjo fitting of claim 4, wherein a first tab extends from the upper washer and a second tab extends from the lower washer.

6. The banjo fitting of claim 4, wherein the block possesses at least one flat surface and wherein the washer pair engages the flat surface to prevent the washer pair from rotating relative to the block.

7. The banjo fitting of claim 6, wherein the block is rectangular.

8. The banjo fitting of claim 4, wherein the washer pair is made of aluminum.

9. The banjo fitting of claim 1, wherein the opening through the block includes an annular cavity for facilitating the passage of fluid between the radial port in the stud and the fluid passageway in the block.

10. The banjo fitting of claim 1, further comprising a cap that is coupled the stud to secure the block on the stud.

11. A block/washer sub-assembly for a banjo fitting, the sub-assembly comprising:
a block having an opening through the block, a fluid passageway that intersects with and is in fluid communication with the opening and at least one substantially flat surface; and
a washer pair having an upper washer and a lower washer connected by a link and having at least one tab extending from one of the upper washer and the lower washer, wherein the washer pair is formed such that the washer pair partially surrounds and is maintained on the block with the upper washer, which is above the block, and the lower washer, which is below the block, aligned with the opening through the block;
wherein the tab on the washer pair engages the substantially flat surface on the block to prevent the washer pair from rotating relative to the block.

12. The block/washer sub-assembly of claim 11, wherein the washer pair is made of aluminum.

13. The block/washer sub-assembly of claim 11, wherein the block is rectangular.

14. A banjo fitting comprising:
- a block having an opening through the block, a fluid passageway that intersects with and is in fluid communication with the opening, and two walls that extend from opposing faces of the block to form a channel; and
- a stud that is received in the opening through the block, the stud having a post portion, a base portion, an axial fluid passageway through the base portion, and a radial fluid port in the post portion that is in fluid communication with the axial fluid passageway;
- wherein the base portion of the stud is received within the channel of the block when the stud is received in the opening through the block;
- wherein the base portion of the stud is sized so as to fit within the channel of the block only in a predetermined angular orientation relative to the block; and
- wherein when the post portion of the stud is received in the opening through the block and the base portion of the stud is aligned with and received within the channel of the block, the radial fluid port in the stud is aligned with and in fluid communication with the fluid passageway in the block.

15. The banjo fitting of claim 14, wherein the stud is prevented from rotating when received in the opening through the block as a result of interfering engagement between the base portion of the stud and the walls of the channel.

16. The banjo fitting of claim 14, further comprising a washer pair having an upper washer and a lower washer connected by a link and having at least one tab extending from one of the upper washer and the lower washer, wherein the washer pair is formed such that the washer pair partially surrounds and is maintained on the block with the upper and lower washers aligned with the opening through the block.

17. The banjo fitting of claim 16, further comprising a cap that is coupled the stud to secure the block on the stud.

* * * * *